United States Patent
Lindsey et al.

(10) Patent No.: US 7,222,404 B1
(45) Date of Patent: May 29, 2007

(54) TRIM CLIP INSTALLATION TOOL AND METHOD

(75) Inventors: Paula Lindsey, Oxford, AL (US); Kenneth E. Strickland, Oxford, AL (US); Shinichi Atsuta, Kawagoe (JP); Robert John Wheeler, Alexandria, AL (US); Jack Leon Perecman, Golden Valley, MN (US)

(73) Assignee: Honda Motor Co., Ltd., Tokyo (JP)

( * ) Notice: Subject to any disclaimer, the term of this patent is extended or adjusted under 35 U.S.C. 154(b) by 56 days.

(21) Appl. No.: 11/189,257

(22) Filed: Jul. 26, 2005

(51) Int. Cl.
    *B23P 11/00* (2006.01)
(52) U.S. Cl. ..................... 29/243.56; 29/278
(58) Field of Classification Search ............. 29/243.56, 29/270–278, 235, 257, 243.5; 254/131, 131.5
    See application file for complete search history.

(56) References Cited

U.S. PATENT DOCUMENTS

| | | |
|---|---|---|
| 0,488,510 A | 12/1892 | Unbehend |
| 2,654,408 A | 10/1953 | Leslie |
| 2,835,028 A | 5/1958 | Wurzel |
| 3,470,600 A | 10/1969 | Hosbach |
| 3,583,744 A | 6/1971 | West |
| 3,641,657 A | 2/1972 | Shufflebarger |
| 3,846,895 A | 11/1974 | Cosham et al. |
| 3,965,776 A | 6/1976 | Wolstenholme et al. |
| 4,079,764 A | 3/1978 | Hayes |
| 4,096,618 A | 6/1978 | Perline et al. |
| 4,146,130 A | 3/1979 | Samuels et al. |
| 4,277,872 A | 7/1981 | Lewis |
| 5,139,307 A | 8/1992 | Koops et al. |
| 5,284,070 A | 2/1994 | Rieck |
| 5,352,010 A | 10/1994 | Brodie et al. |
| 5,423,114 A * | 6/1995 | Johnson ............... 29/267 |
| 5,548,929 A | 8/1996 | Larsen et al. |
| 5,673,904 A | 10/1997 | Shibanushi et al. |
| 5,702,146 A | 12/1997 | Asami |
| 5,832,581 A * | 11/1998 | Barthuli ............... 29/267 |
| 5,953,863 A | 9/1999 | Shibanushi et al. |
| 6,453,531 B1 | 9/2002 | Krass et al. |
| 6,477,758 B2 * | 11/2002 | Krebel ............... 29/267 |
| 6,851,737 B2 | 2/2005 | Okamoto et al. |
| 2004/0117951 A1 | 6/2004 | Nishimura et al. |

* cited by examiner

*Primary Examiner*—Lee D. Wilson
(74) *Attorney, Agent, or Firm*—Standley Law Group LLP (57) ABSTRACT

A tool and process for installing a trim clip to a mounting surface. The tool includes a handle attached to a grasping portion. The grasping portion is provided with a base that is adapted for insertion into a hollow pocket that exists within the trim clip. A pair of retaining arms are maintained at some distance above the base and extend outwardly along the length thereof. The retaining arms each include at least one spring-loaded ball that extends downward from an underside thereof. When the grasping portion is engaged with the trim clip, the trim clip is retained by the presence of the base within the pocket and by a downward force exerted on the trim clip by the spring-loaded balls. The tool can be used to easily remove a trim clip from a storage medium, install the trim clip to a mounting surface, and subsequently release the trim clip.

30 Claims, 11 Drawing Sheets

TRIM CLIP INSTALLATION TOOL AND METHOD

BACKGROUND OF THE INVENTION

The present invention is directed to a tool and process for installing a trim clip to a mounting surface. More particularly, the present invention is directed to a tool and process for ergonomically and cleanly transferring a trim clip from a storage element to the flange of a vehicle windshield and ensuring the melt clip is sufficiently seated thereto.

Trim clips can be used to attach a variety of trim pieces to different mounting surfaces, such as to different parts of a vehicle. Such clips are often installed to a vehicle at some point fairly early in the assembly process, such that they are present on the vehicle prior to the time the vehicle is subjected to a primer and or paint process.

Trim clips may also be attached to a vehicle by a number of methods. For example, such clips may have protruding portions that are designed to engage a receptacle on the vehicle. Commonly, however, such clips are attached to a vehicle by some form of adhesive.

In any event, certain installation criteria must be met regardless of trim clip design or the method used to attach the trim clip to a vehicle. Particularly, each trim clip must be securely attached to the vehicle and it must be attached in the proper location with the proper orientation. With respect to the installed location and orientation of a trim clip, it can be easily understood that if a trim clip is installed in the wrong location and/or in an incorrect orientation, the trim piece that the clip is designed to retain may not mate properly thereto. In the case of adhesive-employing trim clips, these criteria also generally require that the trim clip be pressed to the vehicle with sufficient force to set the adhesive and that the adhesive not be contaminated prior to installation of the clip to the vehicle.

Depending on the design, size, shape and/or other characteristics of the trim clip of interest and the location on the vehicle to which the trim clip is to be installed, meeting one or all of these criteria may be problematic. First, adhesive-backed trim clips require that a sufficient amount pressure be exerted thereupon during installation to the vehicle. Absent the exertion of such pressure, it is quite possible that the trim clip will not be sufficiently adhered to the vehicle, and may become dislodged. Further, and in support of proper adhesive-backed trim clip installation, the clip must typically be transferred to the vehicle with little or no contamination to the adhesive layer. In addition, there is often little or no indication on the vehicle as to the proper location and/or orientation of the trim clip. And, indicating marks or other location aids that are present can easily be covered by corrosion resistant coatings, primer, paint, or various other substances.

Meeting these criteria may be difficult for several reasons. For example, trim clips are commonly installed to a vehicle by hand. However, the design, size, shape and/or other characteristics of a given trim clip can make grasping and or installing the trim clip by hand very difficult—particularly if a worker must wear gloves. This situation can be compounded by the need to place a trim clip in a hard to reach location on/in the vehicle.

Repeated application of trim clips with adequate setting force can also lead to excessive hand stress. This predicament may be due to the exertion of force and the need to repeatedly install a considerable number of clips during each work period. Further, it is generally difficult for a worker to judge whether a clip has been set with sufficient force, which may lead to the use of inadequate or excessive force.

The process of manually installing trim clips also lends itself to the contamination of the adhesive backing. Workers in an industrial setting will commonly have grease, oil or other contaminants present on their hands. Even worse, they may be required to wear gloves where such substances may collect over time. Transfer of such substances to the adhesive backing of a trim clip can adversely affect its ability to adhere to a vehicle surface.

Thus, for these and other reasons it is desirable to employ a tool and a process that allows a user to install a trim clip to a vehicle quickly and easily, and in a clean and ergonomically friendly manner. Preferably, the tool and process also allows a trim clip to be automatically set with a proper amount of force, thereby eliminating the need for the user to speculate as to the level of force being applied. It is also desirable that the tool and process allow for a trim clip to be transferred directly from a shipping or storage medium to a vehicle, thereby minimizing the opportunity for contamination of the adhesive backing.

SUMMARY OF THE INVENTION

The tool and process of the present invention satisfies the aforementioned need. More specifically, the tool and process of the present invention allows a trim clip, particularly an adhesive-backed trim clip, to be removed from a storage medium and applied directly to a vehicle surface with a predetermined amount of setting force. The design of the tool facilitates setting of the trim clip with minimal impact to the user's hand(s), thereby minimizing or eliminating hand stress concerns. Further, because only the tool need touch the trim clip, contamination of the adhesive backing is also minimized.

The tool includes a handle attached to a grasping portion. The grasping portion is designed to easily engage a trim clip while it resides on a storage medium, such as a mounting film used with adhesive-backed trim clips. Once engaged, the tool can be used to remove the trim clip and securely transport it to the vehicle to which it will be installed. When applicable based on the particular type of trim clip being used, the tool is also preferably provided with a mechanism by which a user can easily determine that the clip has been set to the vehicle with adequate force. Once the trim clip has been properly installed to the vehicle, the clip may be easily released by the tool.

Because it is typically important that a trim clip be installed to a vehicle in a proper location and/or orientation, the process of the present invention also includes an optional installation template. The installation template is adapted for quick and removable attachment to the vehicle. The installation template also provides a clear indication of where the trim clip(s) is to be installed on the vehicle, and may also provide for proper orientation of the trim clip. The installation template is preferably adapted for secure but releasable attachment to the vehicle. A magnetic attachment means may be employed for this purpose.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

A tool and process as contemplated by the present invention can be designed and used to install a multitude of different trim clips to a multitude of surfaces. Of particular interest, however, is use of a tool and process of the present invention to install trim clips to a vehicle. Consequently, for purposes of clarity, an illustrative exemplary embodiment(s) of the tool and process of the present invention is presented below only with respect to the installation of a trim clip to a vehicle.

Figure 1A:
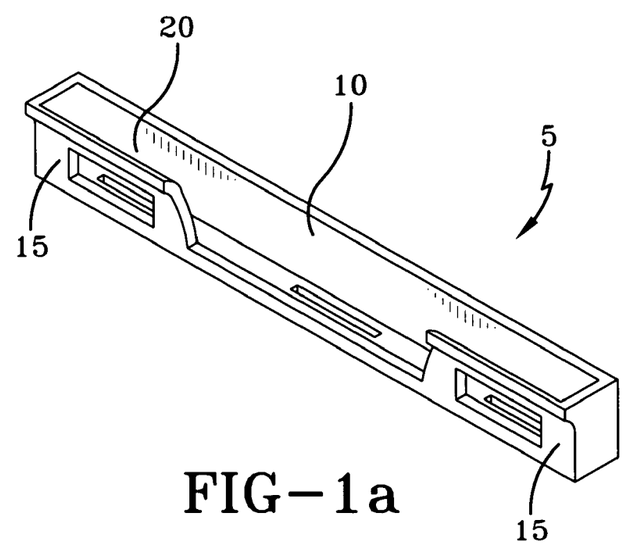
FIGS. 1a and 1b show a perspective and top plan view of one embodiment of a trim clip which may be acted upon by a tool and process of the present invention.
Figure 1B:
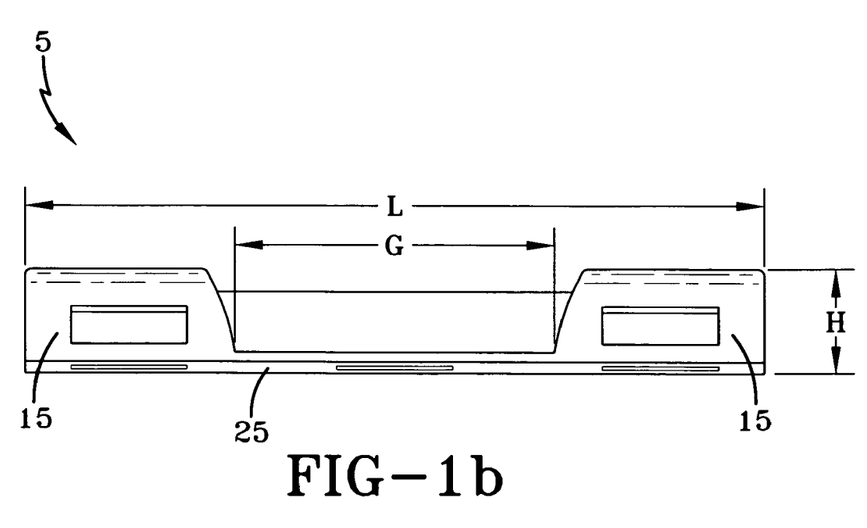
Figure 2:
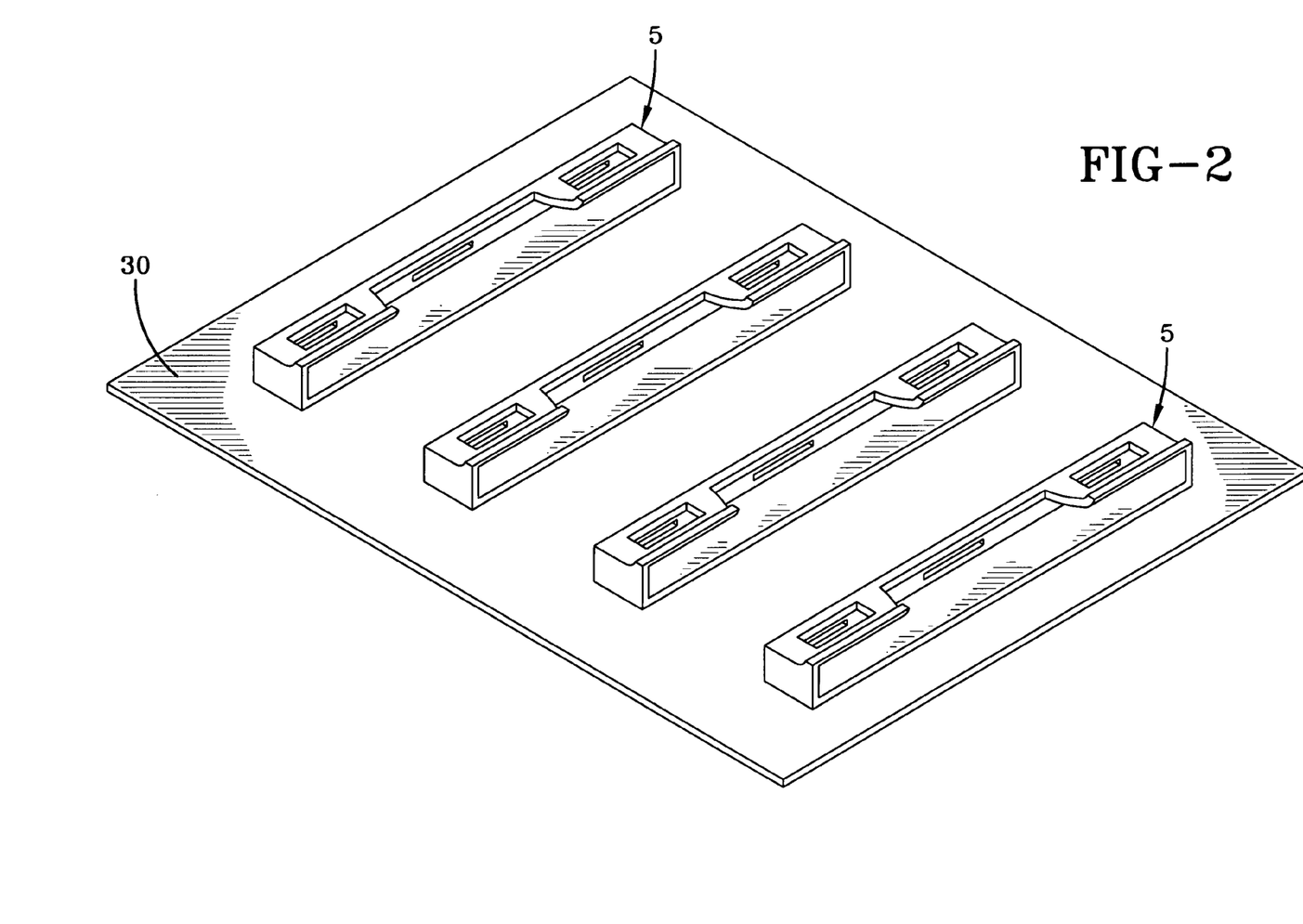
FIG. 2 depicts a plurality of the trim clips of FIGS. 1a–1b releasably secured to a storage medium—in this case, a strip of mounting film.
Figure 3:
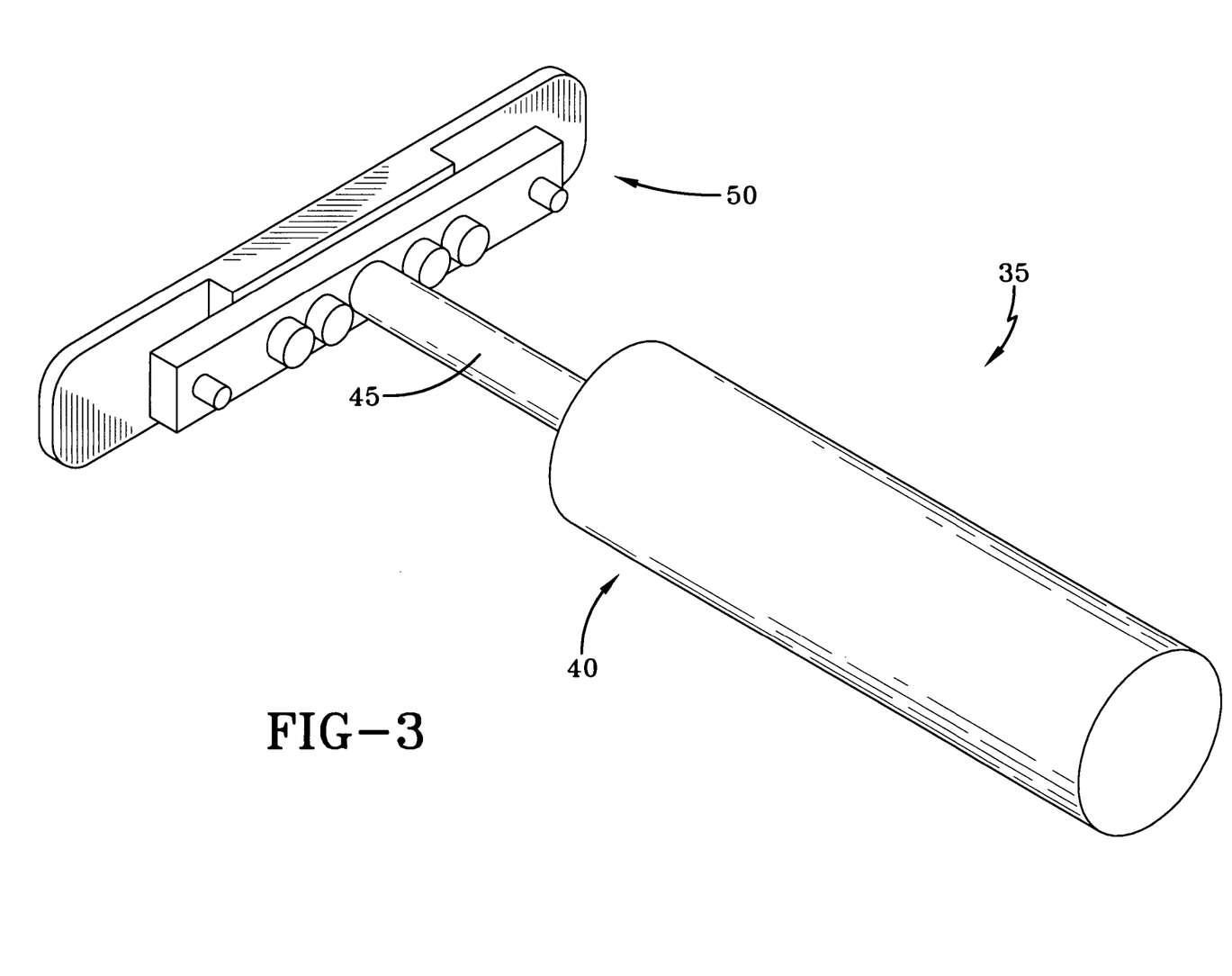
FIG. 3 is a perspective view of one embodiment of a trim clip installation tool of the present invention, which tool is adapted to install trim clips as shown in FIGS. 1–2.

An exemplary trim clip that may be operated upon by the tool and process of the present invention is shown in FIGS. 1–2. While the trim clip 5 shown is used to retain a windshield trim piece to the vehicle once the windshield glass has been installed, it should be realized by one skilled in the art that other similar trim clips may also be installed using a tool and process of the present invention.

Referring particularly to FIGS. 1a–1b, it can be observed that the trim clip 5 is generally of an elongated "C" shape having opposed end legs 15 lying substantially parallel to and being separated from a back wall 10 by a pocket-forming space 20. The trim clip 5 is of some length L and height H. The termini of the end legs 15 are separated by a gap G. The end legs 15 are connected along one side by a bottom wall 25. Consequently, the space 20 forms a hollow pocket within the clip 5.

Although not visible in FIGS. 1–2, each clip 5 includes an adhesive backing layer that resides on a rear surface of the back wall 10 and is used to adhere the clip to a vehicle windshield mounting flange. Such clips 5 may be supplied to an end user in a variety of ways. However, in conjunction with adhesive-backed clips 5 that must be individually installed, it has been found that temporarily securing the clips to a mounting film 30 as shown in FIG. 2 provides for an efficient storage and supply method. Such mounting films are generally coated with a substance that allows the adhesive backing layer to sufficiently adhere the clips 5 to the film, but also permits the easy removal thereof during the installation process.

One exemplary embodiment of a trim clip installation tool 35 of the present invention is illustrated in FIGS. 3–6. As shown, the tool 35 includes a handle 40 connected by an extension 45 to a grasping portion 50 that is designed to releasably engage the trim clip 5 shown in FIGS. 1–2.

Figures 4, 5:
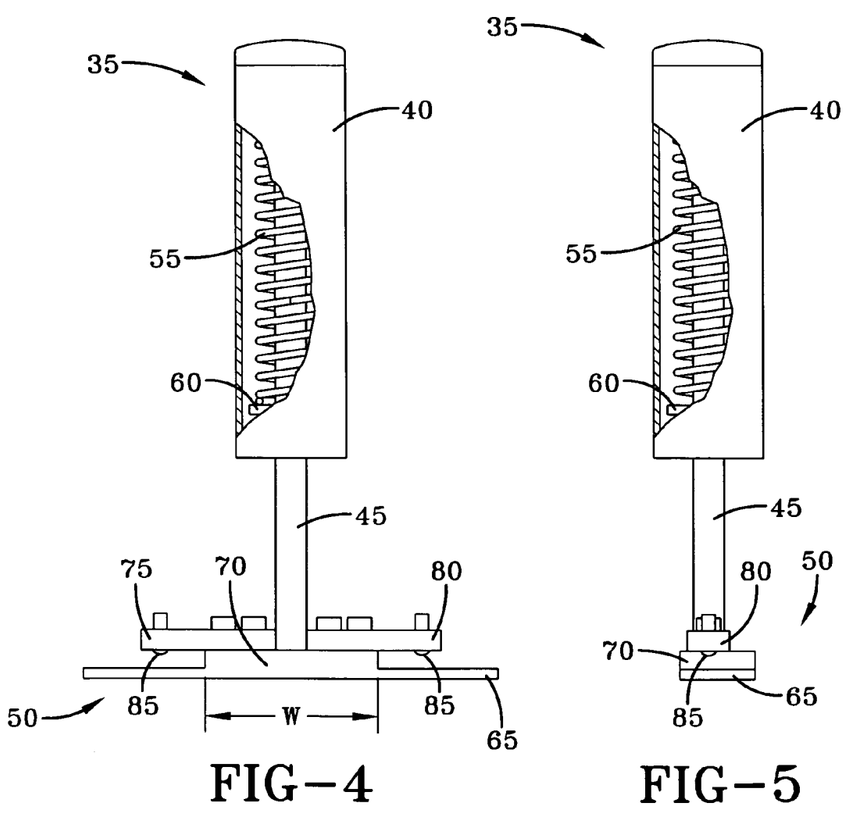
FIG. 4 is a front elevation view of the trim clip installation tool of FIG. 3.
FIG. 5 is a side elevation view of the trim clip installation tool of FIG. 3.
Figure 6:
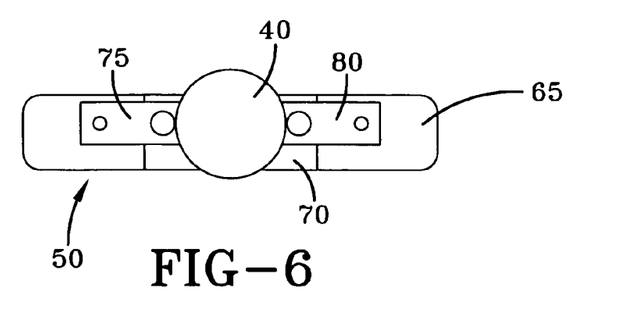
FIG. 6 is a top plan view of the trim clip installation tool of FIG. 3.

Referring particularly to FIGS. 4 and 5, it can be seen that this particular embodiment of the tool 35 is spring-loaded. Although this feature is not essential to a tool of the present invention, it provides for certain benefits that are described in greater detail below.

As can be seen, the extension 45 slidably extends into the handle 40, which is substantially hollow, so as to communicate with a spring 55 located therein. Preferably, but not necessarily, the extension 45 protrudes at least partially into the spring 55 to provide additional stability and/or guidance during spring compression. A spring retainer 60 or some similar element is attached to the extension 45 at a point within the handle 40, and is provided to ensure a compression of the spring 55 upon displacement of the handle toward the grasping portion 50.

In operation, the spring-loaded feature allows a trim clip to be consistently set to a mounting surface (e.g., a windshield mounting flange) with a predetermined amount of force. More specifically, with a trim clip 5 retained by the grasping portion 50 and the trim clip in contact with a mounting surface, depression of the handle 40 will result in a compression of the spring 55. Full compression of the spring 55 within the handle 40 will act as a hard stop against further movement. Thus, by using a spring 55 of a preselected spring rate, it can be substantially assured that a desired amount of force will be transferred to the trim clip 5 upon full depression of the handle 40 toward the grasping portion 50. For example, if a compression spring having a total spring rate of 10 lb/in is used, it can be reasonably assured that approximately ten pounds of setting force will be transferred to the trim clip 5 if depression of the handle 40 compresses the spring one inch.

This spring-loaded feature is useful for several reasons. First, it allows for the tool 35 to be supplied with an automatic setting force, which can be altered simply by changing the spring 55. Additionally, it allows a user of the tool 35 to know when the proper amount of setting force has been achieved. Such is accomplished simply by depressing the handle 40 until the spring 55 is fully compressed and, therefore, acts as a hard stop against further handle movement. This is in contrast to a rigid tool design, wherein a user would be required to speculate as to how hard to press down on the handle 40. Such speculation can lead to the installation of trim clips 5 with an inadequate amount of force, thereby leading to trim clips becoming inadvertently dislodged from the mounting surface. In an attempt to properly install the trim clips 5, it is also possible to use excessive force. This can lead to damage to the tool 35, the trim clip 5, or the mounting surface, and imparts an unnecessarily high amount of force to a user's hand(s). Therefore, in addition to improving quality, a tool and process of the present invention can also improve the ergonomics of a trim clip installation process.

The grasping portion 50 of the tool 35 is responsible for engaging a trim clip 5 while the trim clip is attached to the mounting film 30 or other storage medium. The grasping portion 50 of the tool 35 is also responsible for retaining the trim clip while it is removed from the mounting film and transferred and adhered to a mounting surface (e.g., the windshield mounting flange).

To this end, the grasping portion 50 is provided with several features that allow it to easily engage, retain, and subsequently disengage a melt clip 5. As shown, the grasping portion 50 includes a base 65 that is of a size and shape that allows it to fit within the pocket formed within the trim clip 5. Preferably, but not necessarily, the base 65 is of a length and thickness that is only slightly less than the length and depth, respectively, of the pocket formed within the trim clip 5. In this manner, the trim clip 5 can fit releasably but securely over the base 65.

The base 65 is attached to the extension 45 by an upwardly projecting riser 70. A top surface of the riser 70 serves as a support/mount for one or more outwardly extending retaining arms 75, 80 that function in conjunction with the base 65 to retain the trim clip 5. Although a pair of retaining arms 75, 80 are shown in this particular embodiment, it is also possible to make use of only a single retaining arm or of more than two retaining arms. The riser 70 preferably extends upward a distance that is just sufficient to allow the underside of the retaining arms 75, 80 to clear the corresponding surface of the end legs 15 of the trim clip 5 when the trim clip is properly engaged by the grasping portion 50. The length W of the riser 70 is selected such that the riser is able to fit within the gap G that exists between the end legs 15 of the trim clip 5.

The retaining arms 75, 80 extend along the length of the base 65. Preferably, each retaining arm 75, 80 is of a length that allows a portion thereof to overly a corresponding one of the end legs 15 of the trim clip 5 when the trim clip is properly engaged by the grasping portion 50. At least one spring-loaded ball 85 preferably resides within each retaining arm 75, 80. As can be best observed in FIGS. 4 and 5, a portion of each spring-loaded ball 85 protrudes downward through an aperture in the underside of each retaining arm 75, 80. The spring-loaded balls 85 function to exert a retaining force against a subjacent surface of a trim clip 5 when it is engaged by the grasping portion 50.

Manufacture of the grasping portion 50 may be accomplished in a variety of ways. For example, the various components forming the grasping portion 50 may be produced as separate elements and then subsequently joined together with fasteners, by welding, or by some combination thereof. Alternatively, the grasping portion 50 may be machined, cast, or molded as substantially one unitary component. Although the grasping portion 50 is shown to be comprised of metal herein, it should be understood that the grasping portion may also be manufactured from plastic, a composite, or virtually any other material strong enough to retain and install a trim clip.

Figure 7:
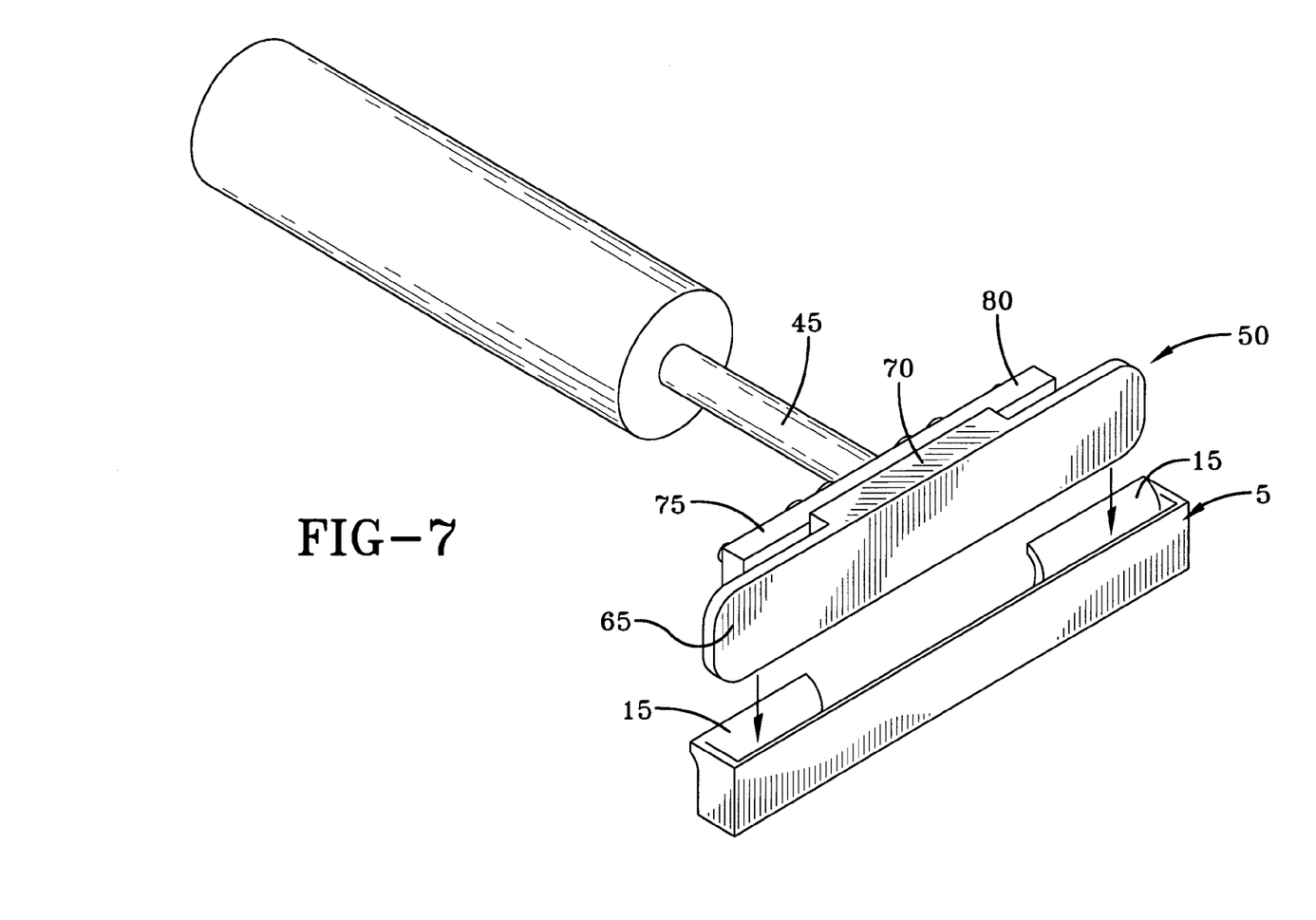
FIG. 7 is a perspective view of the trim clip installation tool of FIGS. 3–6 being engaged with a trim clip of FIGS. 1–2.

The process of engaging the grasping portion 50 with a trim clip 5 can be observed in FIG. 7. For clarity, the trim clip 5 has been rotated to expose the rear of its back wall 10 in this view. As can be seen, engagement of the grasping portion 50 with a trim clip 5 is accomplished by properly orienting the grasping portion and sliding the base 65 into the pocket 20. As the base 65 enters the pocket 20 formed within the clip 5, the riser 70 passes through the gap G existing between the termini of the end legs 15. The bottom wall 25 of the trim clip 5 may act as a hard stop against movement of the base 65 as it is inserted into the pocket 20 in the trim clip.

Figure 8:
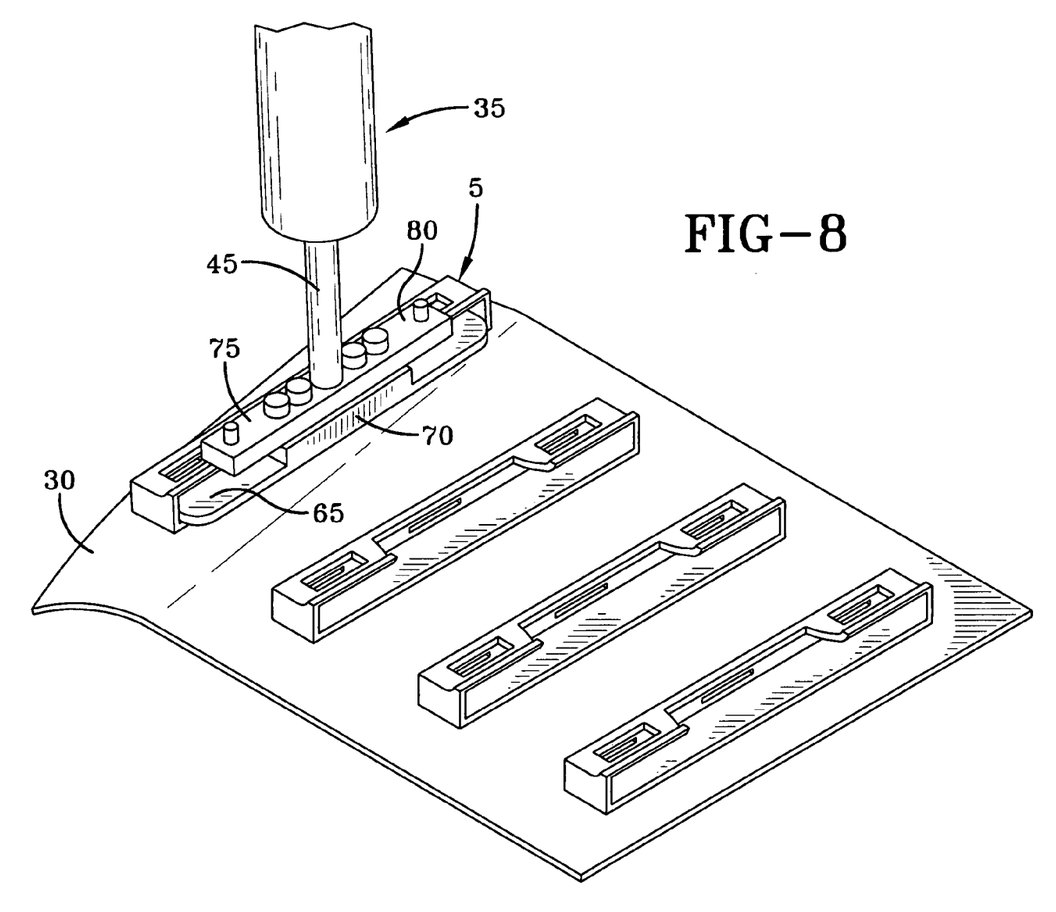
FIG. 8 shows the trim clip installation tool of FIGS. 3–6 being used to remove a trim clip from the storage medium depicted in FIG. 2.

The grasping portion 50 of the tool 35 and a trim clip 5 are shown in a fully engaged position in FIG. 8. As shown, the base 65 resides substantially within the pocket 20 of the trim clip 5, and the riser 70 resides within the gap G existing between the termini of the end legs 15. The retaining arms 75, 80 each overly a portion of a corresponding end leg 15 such that the spring-loaded balls 85 exert a downward retaining force on the trim clip 5. The trim clip 5 is thus securely but releasably retained by the grasping portion 50 of the tool 35, and can be easily removed from the mounting film 30 or other storage medium by a user.

Figure 9:
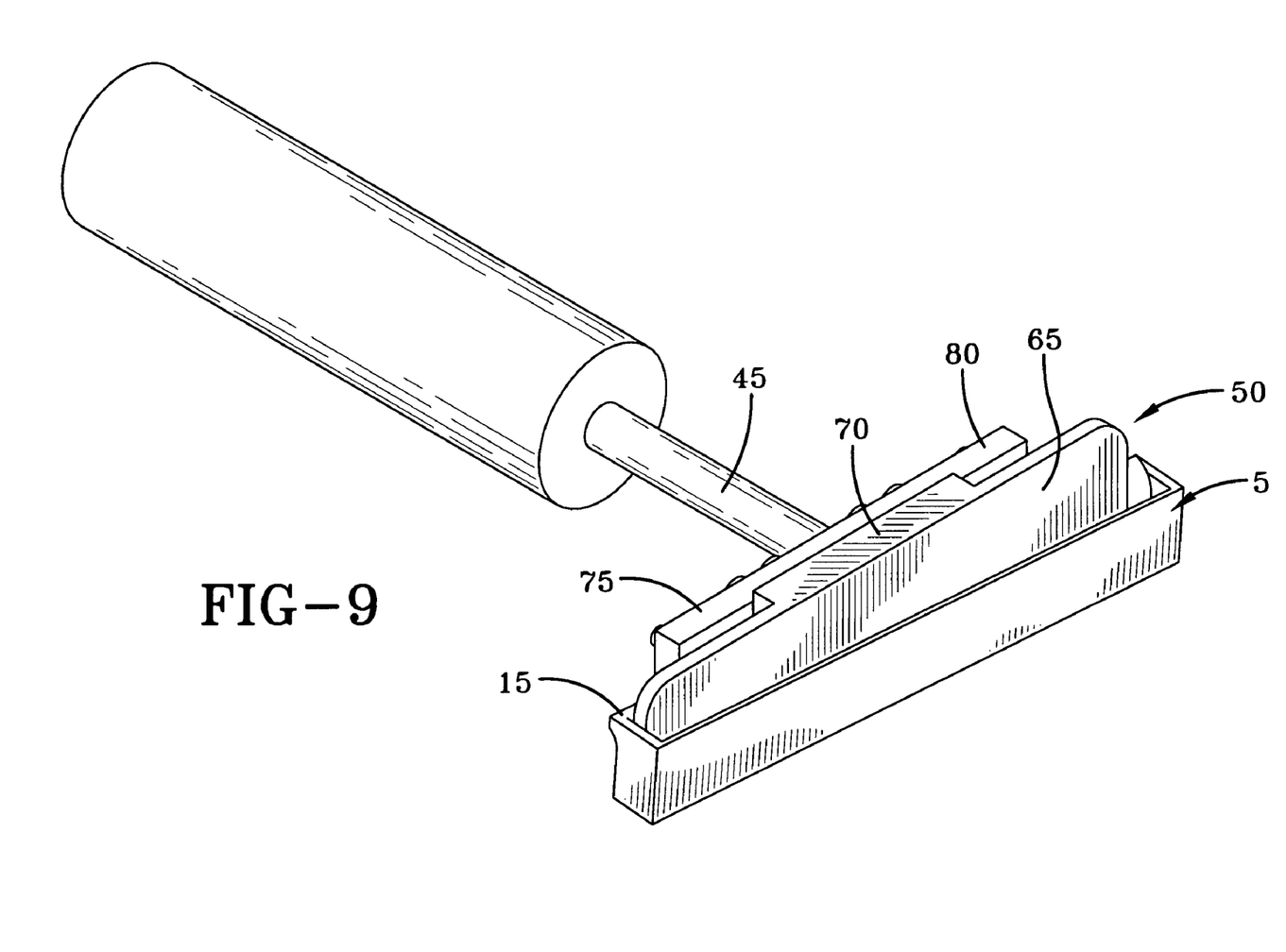
FIG. 9 illustrates one method for disengaging the trim clip installation tool of FIGS. 3–6 from a trim clip of FIGS. 1–2.

One method of disengaging the grasping portion 50 from the trim clip 5 is illustrated in FIG. 9. Although for clarity the trim clip 5 has again been rotated in this view, it should be realized that the trim clip would actually be adhered to the mounting surface during this step of the process. Disengagement of the tool 35 with the trim clip 5 can be accomplished by simply withdrawing the base 65 from the pocket 20 in a reverse manner to that in which it was inserted. The bond between the adhesive backing of the trim clip 5 and the mounting surface should be sufficient to retain the trim clip during this process. However, in order to minimize the risk that the trim clip 5 may be dislodged during this process, it may be preferable to disengage the grasping portion 50 from the trim clip by rotating the tool 35. In this manner, only one end of the base 65 at a time is withdrawn from the trim clip 5, thereby requiring the trim clip to resist the retaining force of only one spring-loaded ball 85. Although a clockwise rotation of the tool 35 (and included grasping portion 50) is depicted in FIG. 9, a counterclockwise rotation may also be employed.

Figure 10:
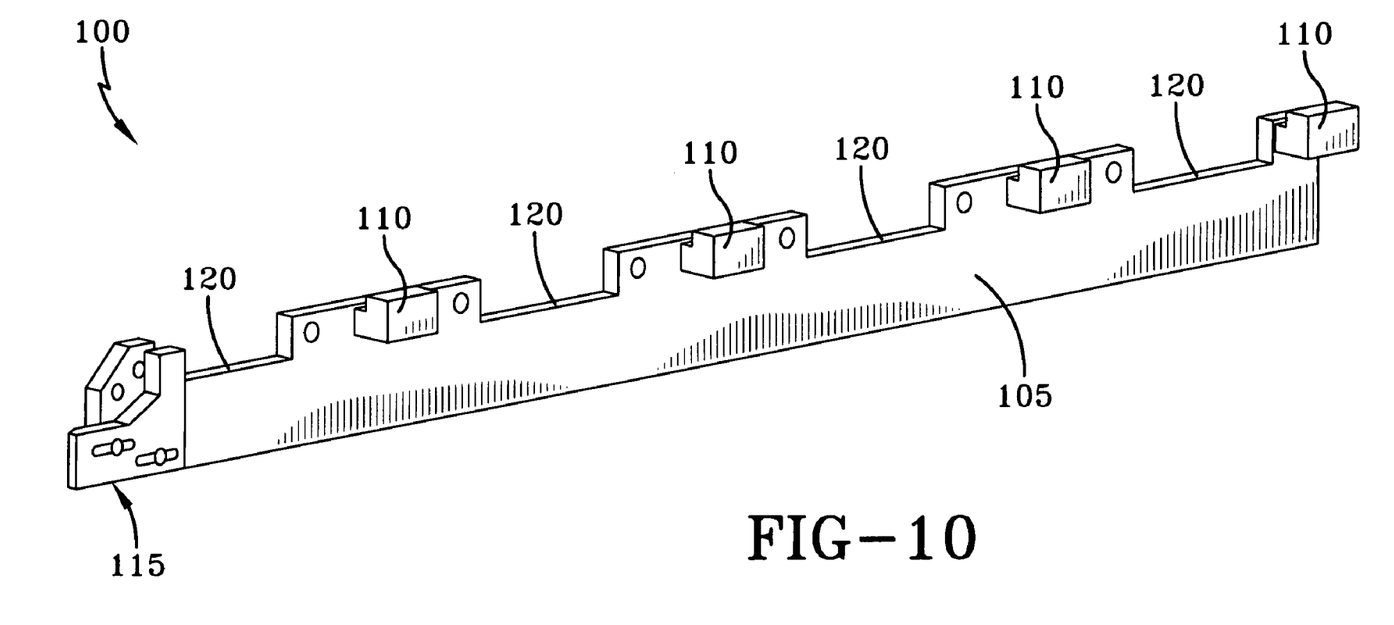
FIG. 10 is a perspective view of one embodiment of a trim clip installation template of the present invention.
Figure 11:
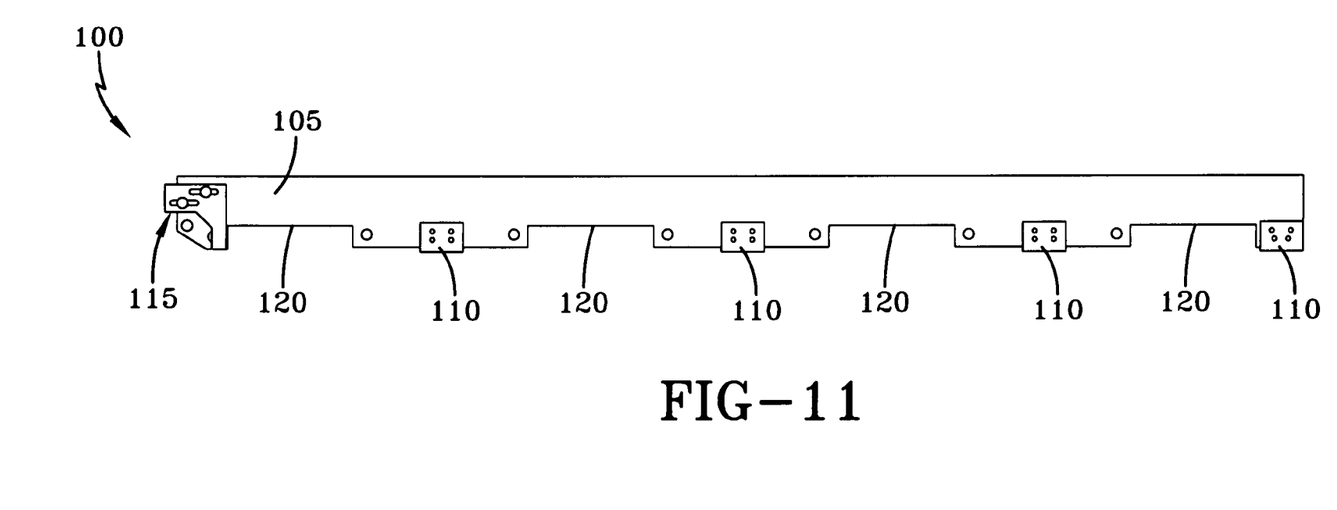
FIG. 11 is a top plan view of the trim clip installation template of FIG. 10.
Figure 12:
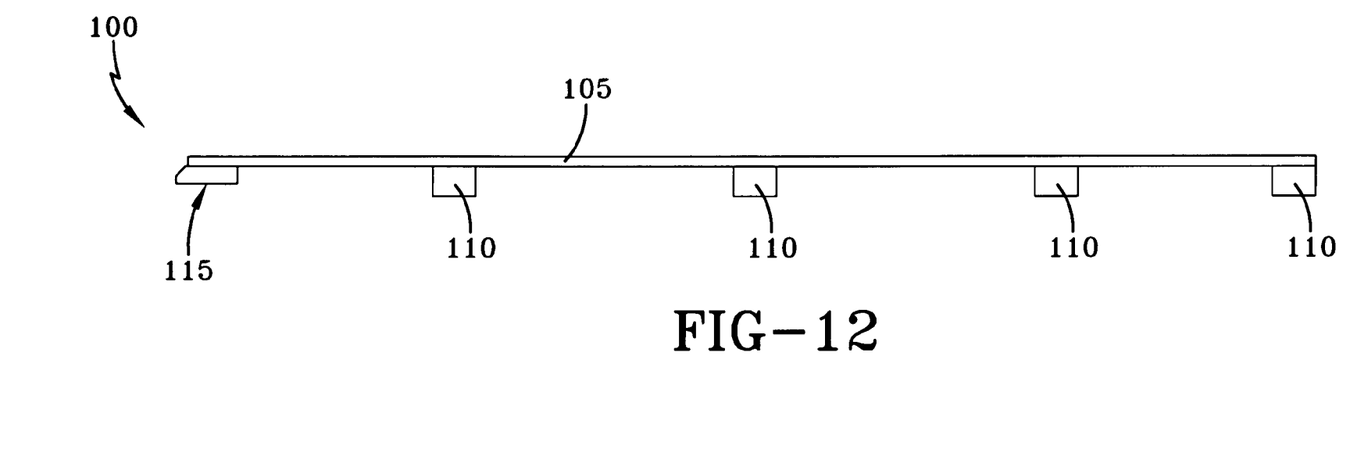
FIG. 12 is a side view of the trim clip installation template of FIG. 10.

An optional trim clip installation template 100 is shown in FIGS. 10–12. The template 100 can be used to assist with achieving the proper location and/or orientation of one or more trim clips to a mounting surface. Such a template may have a variety of sizes and shapes. However, the template 100 shown in FIGS. 10–12 is designed specifically for use on the mounting flange 125 of a vehicle windshield opening (see FIGS. 13–14).

The template 100 is provided with a base 105 that abuts one surface 130 of the windshield mounting flange 125. A plurality of stop blocks 110 are attached to the base 105 to fix the location of the template 100 with respect to a second surface 135 of the windshield mounting flange 125.

At least one end of the template 100 is also provided with a locating element 115 that allows the template 100 to be quickly and easily located and attached to the windshield mounting flange 125. As can be seen most clearly in FIG. 13, the locating element 115 of this embodiment is designed to mate with intersecting horizontal and vertical portions of the windshield mounting flange 125 at the roof line of the vehicle. The locating element 115 thus allows the template 100 to be quickly installed to a vehicle in the proper location and orientation.

A number of trim clip locating and orienting slots 120 are also formed in the template 100. The slots 120 allow a user to quickly and easily install the proper number of trim clips 5 to the windshield mounting flange 125, with each in the proper location and orientation.

Although not essential, it is preferable that the template 100 be provided with a retaining means that securely but releasably affixes the template to the windshield mounting flange 125 during the installation process. As the vehicle body to which the template 100 will be attached is metallic, it has been found that affixing one or more magnets to the rear surface of the template works well for this purpose. The magnets provide sufficient retaining power to maintain the position of the template 100 during use, but also permit the easy removal of the template when the trim clip installation process is complete.

The template 100 may be manufactured from any number of materials including, for example, plastics, fiberglass, composites, wood, and metals. However, as it may often be necessary to avoid scratching or otherwise marring the mounting surface, it has been found that materials such as nylon provide for good results when used to produce such a template.

Figure 13:
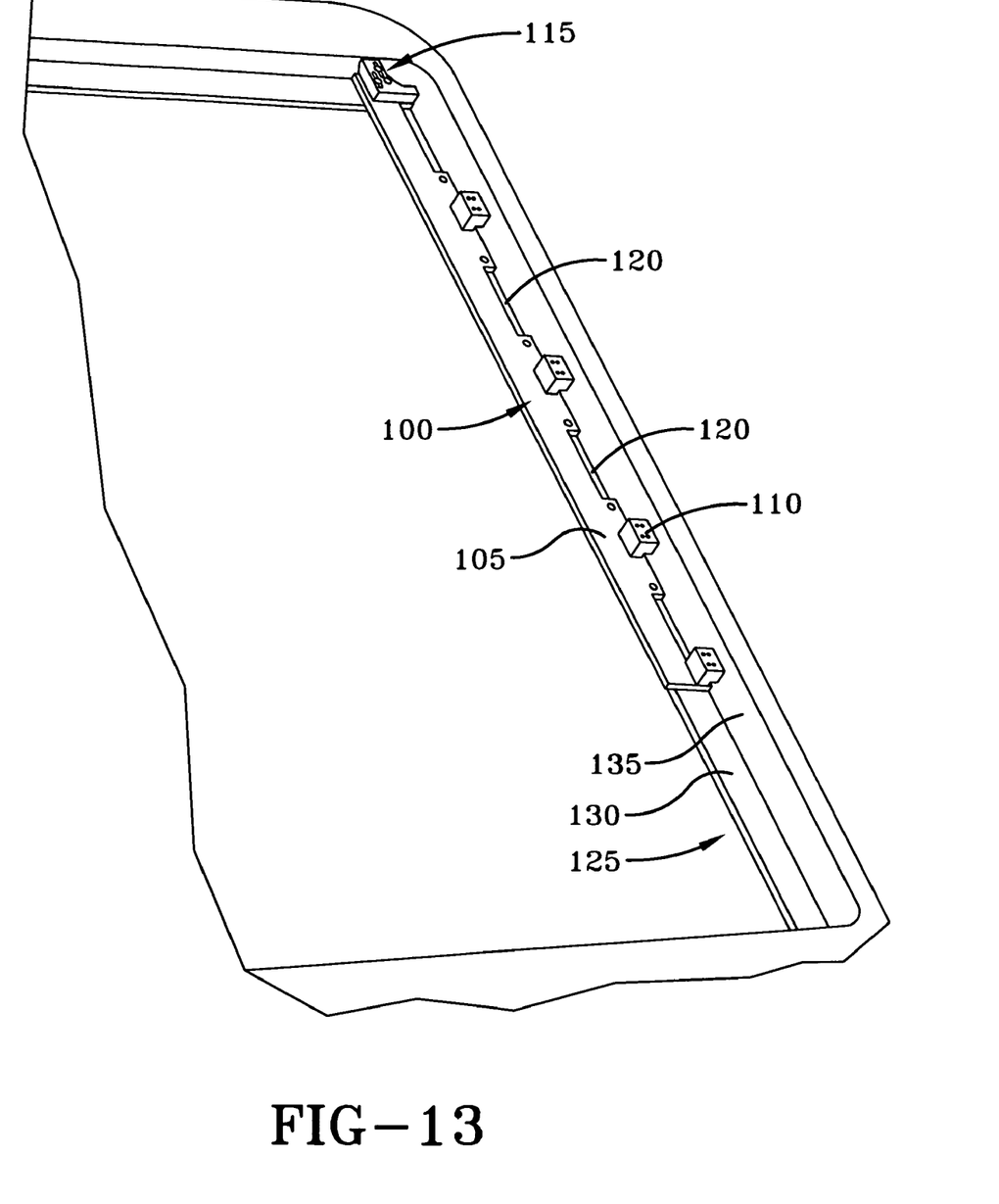
FIG. 13 shows the trim clip installation template of FIGS. 10–12 installed to a mounting flange of a vehicle windshield opening.

The template 100 of FIGS. 10–12 is shown releasably attached to the windshield mounting flange 125 of a vehicle in FIG. 13. As can be seen, the base 105 rests against a first surface 130 of the windshield mounting flange 125, while the stop blocks 110 abut a second surface 135. In conjunction with the locating element 115, these components serve to define the proper location of the template 100 on the windshield mounting flange 125. Consequently, the slots 120 will correspondingly define the proper location and orientation for each trim clip 5.

Figure 14:
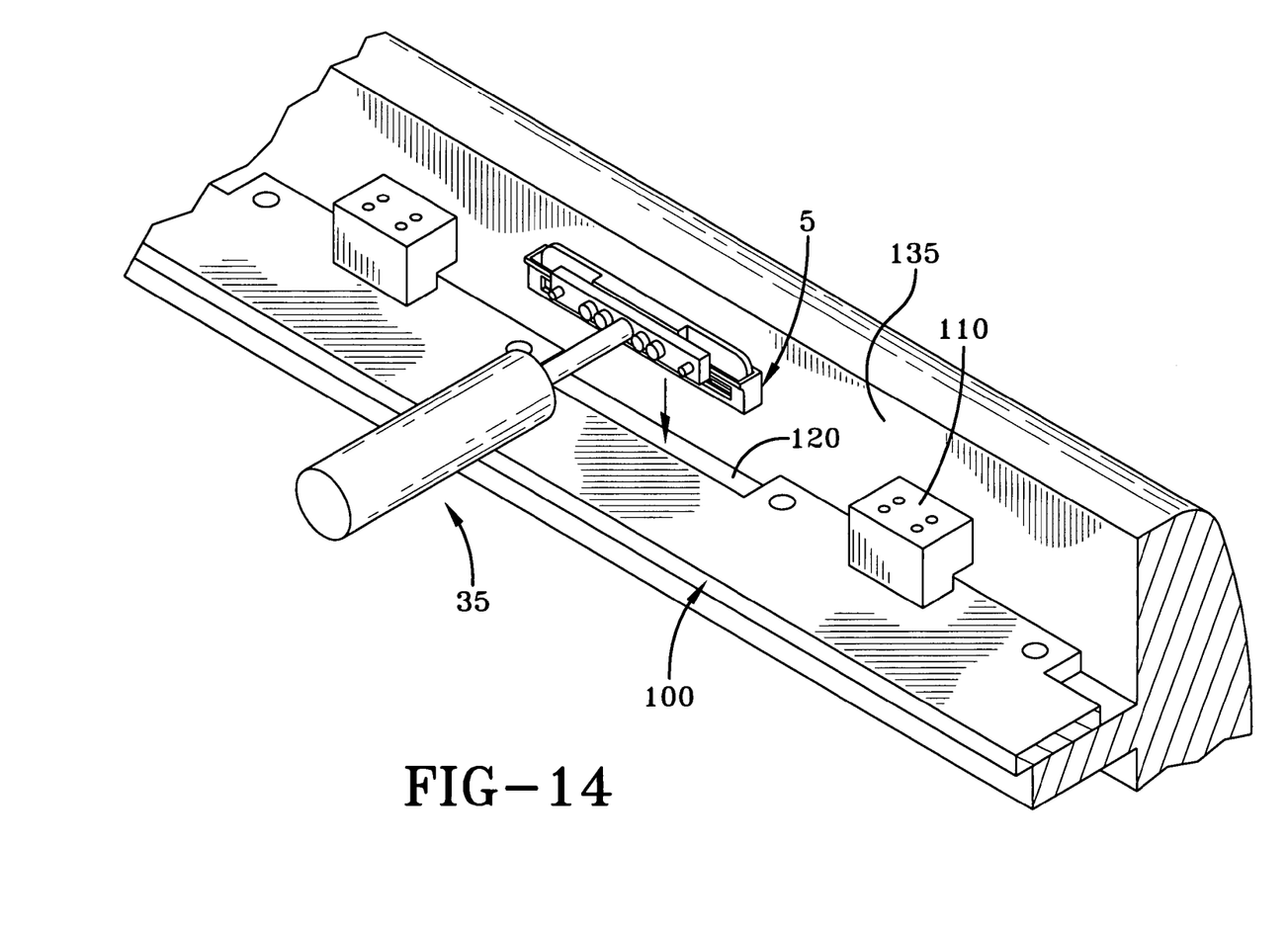
FIG. 14 depicts the trim clip installation tool of FIGS. 3–6 and the trim clip installation template of FIGS. 10–12 being used to install a trim clip of FIGS. 1–2 to the windshield mounting flange shown in FIG. 13.

Installation of a trim clip 5 using the trim clip installation tool 35 and template 100 of the present invention is illustrated in FIG. 14. As shown, the template 100 has already been attached to the windshield mounting flange 125, and a trim clip 5 has been engaged and retained by the grasping portion 50 of the tool 35. A user is thus able to use the tool 35 and one of the slots 120 in the template to adhere the trim clip 5 to the second surface 135 of the windshield mounting flange 125 in the proper location and with the proper orientation.

While certain embodiments of the present invention are described in detail above, the scope of the invention is not to be considered limited by such disclosure, and modifications are possible without departing from the spirit of the invention as evidenced by the following claims:

What is claimed is:

1. A trim clip installation tool for installing a trim clip to a mounting surface, comprising:
    a handle; and
    a grasping portion attached to said handle and provided to engage said trim clip, said grasping portion further comprising:
        a base designed to fit within a substantially hollow pocket formed in said trim clip,
        a riser connecting said base with said handle,
        at least one retaining arm extending along a length direction of said base and outwardly from said riser, and
        at least one spring-loaded ball extending downward toward said base from an underside of said at least one retaining arm;
    wherein, when said base is properly inserted into said pocket in said trim clip, a surface of said trim clip lies subjacent to said at least one retaining arm and in close enough proximity thereto that said at least one spring-loaded ball exerts a retaining force on said surface of said trim clip.

2. The trim clip installation tool of claim 1, wherein said trim clip approximates an elongated "C" shape having opposed end legs lying substantially parallel to and being separated from a back wall by a space that forms a pocket within said trim clip, said end legs connected along one side by a bottom wall and having their termini separated by a gap.

3. The trim clip installation tool of claim 2, wherein said riser has a length that permits its passage into said gap between said termini of said extending legs of said trim clip.

4. The trim clip installation tool of claim 2, wherein said bottom wall of said trim clip serves as a hard stop for said base upon its insertion into said pocket.

5. The trim clip installation tool of claim 1, wherein said handle is attached to said grasping means by an extension that extends into said handle.

6. The trim clip installation tool of claim 5, further comprising a spring within said handle, said spring compressed within said handle upon its depression toward said grasping means by said extension.

7. The trim clip installation tool of claim 6, wherein a given compression of said spring will cause a specific force to be transferred to said trim clip.

8. A trim clip installation tool for installing a trim clip to a mounting surface, comprising:
    a handle; and
    a grasping portion attached to said handle and provided to engage said trim clip, said grasping portion further comprising:
        a base designed to fit within a substantially hollow pocket formed in said trim clip,
        a riser connecting said base with said handle;
        at least one retaining arm extending outward from said riser along a length of said base, said at least one retaining arm located such that an underside thereof resides at some distance above a corresponding surface of said trim clip when said base is inserted into said pocket;
        at least one spring-loaded ball extending downward toward said base from said underside of said at least one retaining arm;
    wherein, when said base is properly inserted into said pocket in said trim clip, said at least one spring-loaded ball exerts a retaining force on said surface of said trim clip.

9. The trim clip installation tool of claim 8, wherein said trim clip approximates an elongated "C" shape having opposed end legs lying substantially parallel to and being separated from a back wall by a space that forms a pocket within said trim clip, said end legs connected along one side by a bottom wall and having their termini separated by a gap.

10. The trim clip installation tool of claim 9, wherein said riser has a length that permits its passage into said gap between said termini of said extending legs of said trim clip.

11. The trim clip installation tool of claim 9, wherein said bottom wall of said trim clip serves as a hard stop for said base during its insertion into said pocket.

12. The trim clip installation tool of claim 8, wherein said handle is attached to said grasping means by an extension that extends into said handle.

13. The trim clip installation tool of claim 12, further comprising a spring within said handle, said spring compressed within said handle upon its depression toward said grasping means by said extension.

14. The trim clip installation tool of claim 13, wherein a given compression of said spring will cause a specific force to be transferred to said trim clip.

15. A trim clip installation tool for installing a trim clip to a mounting surface, wherein said trim clip approximates an elongated "C" shape having opposed end legs lying substantially parallel to and being separated from a back wall by a space that forms a pocket within said trim clip, said end legs connected along one side by a bottom wall and having their termini separated by a gap, said tool comprising:

a handle; and a grasping portion attached to said handle and provided to engage said trim clip, said grasping portion further comprising:

a base designed to fit within said pocket in said trim clip, a riser extending upward from said base and connecting said base with said handle, at least one retaining arm extending outward from said riser along a length of said base, said at least one retaining arm located such that an underside thereof resides a minimal distance above at least one end leg of said trim clip when said base is inserted into said pocket;

at least one spring-loaded ball residing in said at least one retaining arm and extending downward toward said base through an aperture in said underside of said at least one retaining arm;

wherein, when said base is properly inserted into said pocket in said trim clip, said at least one spring-loaded ball exerts a retaining force on a surface of said trim clip.

16. The trim clip installation tool of claim 15, wherein said riser is of a length that permits its passage into said gap between said termini of said extending legs of said trim clip.

17. The trim clip installation tool of claim 15, wherein said bottom wall of said trim clip serves as a hard stop for said base during its insertion into said pocket.

18. The trim clip installation tool of claim 15, wherein said handle is attached to said grasping means by an extension that extends into said handle.

19. The trim clip installation tool of claim 18, further comprising a spring within said handle, said spring compressed within said handle upon its depression toward said grasping means by said extension.

20. The trim clip installation tool of claim 19, wherein a given compression of said spring will cause a specific force to be transferred to said trim clip.

21. A method of installing a trim clip to a mounting surface, wherein said trim clip has an adhesive backing and approximates an elongated "C" shape having opposed end legs lying substantially parallel to and being separated from a back wall by a space that forms a pocket within said trim clip, said end legs connected along one side by a bottom wall and having their termini separated by a gap, said method comprising:

providing a trim clip installation tool, said tool comprising:

a handle; and a grasping portion attached to said handle and provided to engage said trim clip, said grasping portion further comprising:

a base designed to fit within said pocket in said trim clip, a riser connecting said base with said handle;

at least one retaining arm extending outward from said riser along a length of said base, said at least one retaining arm located such that an underside thereof resides at some distance above a corresponding surface of said trim clip when said base is inserted into said pocket, and at least one spring-loaded ball residing in said at least one retaining arm and extending downward toward said base through an aperture in said underside of said at least one retaining arm;

inserting said base of said trim clip installation tool into said pocket in said trim clip while said trim clip is temporarily retained by a storage medium, said trim clip being retained on said tool due at least in part to a retaining force exerted on a surface of said trim clip by said at least one spring-loaded ball;

removing said trim clip from said storage medium using said trim clip installation tool;

transferring said trim clip to a mounting surface using said trim clip installation tool;

pressing said trim clip against said mounting surface using said trim clip installation tool such that said adhesive backing adheres said trim clip to said mounting surface; and releasing said trim clip from said trim clip installation tool.

22. The method of claim 21, wherein said trim clip is used to secure a trim piece along the periphery of a vehicle windshield.

23. The method of claim 22, wherein said mounting surface comprises a mounting flange substantially surrounding a vehicle windshield opening.

24. The method of claim 21, wherein said storage medium comprises a mounting film.

25. The method of claim 24, wherein said mounting film retains a plurality of said trim clips.

26. The method of claim 21, further comprising using an installation template to indicate the proper location for one or more of said mounting clips on said mounting surface.

27. The method of claim 26, wherein said installation template is releasably attached to said mounting surface.

28. The method of claim 27, wherein said installation template is magnetically attached to said mounting surface.

29. The method of claim 21, further comprising locating a spring within said handle of said trim clip installation tool, said spring compressed within said handle upon depression of said handle toward said grasping means by a user during installation of a trim clip.

30. The method of claim 29, wherein a given compression of said spring will cause a specific force to be transferred to said trim clip.

* * * * *